United States Patent [19]

Ingram et al.

[11] 3,979,153

[45] Sept. 7, 1976

[54] MASTER CYLINDER ASSEMBLIES FOR VEHICLE HYDRAULIC BRAKING SYSTEMS

[75] Inventors: Brian Ingram, Balsall Common; David Anthony Harries, Shirley, both of England

[73] Assignee: Girling Limited, Birmingham, England

[22] Filed: Aug. 5, 1975

[21] Appl. No.: 601,994

Related U.S. Application Data

[63] Continuation of Ser. No. 424,887, Dec. 14, 1973, abandoned.

[30] Foreign Application Priority Data

Mar. 31, 1973 United Kingdom............... 15597/73
Dec. 15, 1972 United Kingdom............... 57887/72

[52] U.S. Cl. ............................ 303/6 R; 188/181 R; 188/345; 303/10; 303/21 AF; 303/21 F; 303/68

[51] Int. Cl.² ...................... B60T 8/02; B60T 15/02

[58] Field of Search .......... 303/21 F, 21 AF, 61–63, 303/68–69, 10, 6 R; 188/181 A, 181 R, 345

[56] References Cited

UNITED STATES PATENTS

| | | | |
|---|---|---|---|
| 3,401,982 | 9/1968 | Walker et al. | 303/21 F |
| 3,524,683 | 8/1970 | Stelzer | 303/21 F |
| 3,606,488 | 9/1971 | Beuchle et al. | 303/21 F |
| 3,608,982 | 9/1971 | Inada et al. | 303/21 F |
| 3,659,905 | 5/1972 | Goulish | 303/21 F |
| 3,729,235 | 4/1973 | Bach et al. | 303/21 F |
| 3,738,712 | 6/1973 | Flory | 303/21 F |
| 3,813,130 | 5/1974 | Inada | 303/21 F |

FOREIGN PATENTS OR APPLICATIONS

| | | | |
|---|---|---|---|
| 1,929,216 | 12/1970 | Germany | 303/21 F |

Primary Examiner—Trygve M. Blix
Assistant Examiner—Douglas C. Butler
Attorney, Agent, or Firm—Scrivener Parker Scrivener and Clarke

[57] ABSTRACT

A booster operated master cylinder piston for use in an anti-skid braking system includes a modulator piston located between the master cylinder piston and the booster valve assembly. In the event of a skid the pressure of booster fluid acting on the modulator piston is relieved.

2 Claims, 7 Drawing Figures

VALVE ASSEMBLY

MASTER CYLINDER ASSEMBLIES FOR VEHICLE HYDRAULIC BRAKING SYSTEMS

This is a continuation of application Ser. No. 424,887 filed Dec. 14, 1973 and now abandoned.

SPECIFIC DESCRIPTION

This invention relates to master cylinder assemblies for vehicle hydraulic braking systems of the kind comprising a piston adapted to be advanced in a bore in a housing to generate fluid pressure in a pressure space in the bore in front of the piston, an inlet port in the housing adapted to connect the pressure space to a reservoir for fluid through a normally open valve which is closed when the piston is advanced, and an outlet port in the housing adapted to connect the pressure space to at least one wheel brake. Master cylinder assemblies of this kind may generate pressure hydrostaticaly, with or without power assistance, or by operating valve means controlling a source of hydraulic fluid under pressure.

When the master cylinder assemblies of the kind set forth are combined in vehicle hydraulic braking systems it is desirable also to incorporate in the system modulating means for relieving the fluid pressure applied to the wheel brake in skid conditions.

Such modulating means usually includes a modulator for cutting-off the supply of fluid to the wheel brake and subsequently modulating the pressure of the fluid to release and re-apply the brake, the modulator being responsive to the deceleration of the braked wheel.

Such braking systems are complex and expensive and it may be necessary to provide separate sources of hydraulic fluid under pressure for operation of the master cylinder assembly and the modulator. A considerable amount of space is required to accommodate the modulators which are bulky. Usually a separate modulator is required for each front wheel brake, and a further additional modulator for the rear wheel brakes.

According to our invention a master cylinder assembly of the kind set forth includes means for applying a force to the piston to advance the piston, and modulating means for modulating the force applied to the piston in skid conditions.

Thus modulation of the braking pressure is achieved by modulating the force applied to the master cylinder piston. When the master cylinder assembly is installed in a vehicle braking system the functions of brake application and modulation are performed in a single assembly which is smaller than a separate master cylinder and modulator. Hence installations in a limited space is facilitated.

The applying means may apply a force directly to the piston but conveniently the applying means includes a booster valve assembly for controlling booster fluid under pressure to advance the piston; and conveniently the modulating means includes a modulator piston adapted to advance the master cylinder piston under the force provided by the booster fluid.

The booster fluid may be applied to the modulator piston through fluid control means which are arranged to cut off the supply and relieve the pressure in the event of a skid.

The master cylinder piston may be part of a separate hydrostatic master cylinder or power valve assembly which is attached to or integral with the modulator piston/booster valve assembly. The master cylinder piston may also control the supply of booster fluid to the brake, so that a single source of fluid under pressure may be used to perform two separate functions. Preferably, the master cylinder piston and the modulator piston are separate though they could be integral.

The master cylinder piston may be the primary piston of a tandem master cylinder. In any one master cylinder assembly according to the invention there may be one, two, three or more master cylinder pistons. Where there are a plurality of master cylinder pistons they may be arranged in parallel and angularly spaced about the axis of a single booster valve assembly.

A separate modulating piston may be provided for each master cylinder piston, whereby the braking pressure generated by each master cylinder piston can be controlled individually by the fluid control means. A single modulating piston may be used for two or more master cylinder pistons. This will not be so efficient since braking pressure may be relieved on a non-skidding wheel.

Preferably the booster valve assembly is pedal-operated and so arranged that a pedal-operated member applies the modulating piston or pistons mechanically in the event of a failure in the supply of booster fluid.

The booster valve assembly includes a normally open reservoir valve and a normally closed inlet valve.

This invention also relates to anti-skid hydraulic braking systems incorporating a master cylinder assembly of the kind set forth, means for applying a force to the master cylinder piston to apply the brake, modulating means for modulating the force applied to the piston, and skid sensing means for actuating the modulating means.

Conveniently, the master cylinder assembly is operated by a fluid under pressure and the modulating means are arranged to relieve the force applied by the fluid.

Some embodiments of a master cylinder assembly according to our invention are illustrated by way of examples in the accompanying drawings, in which FIG. 1 is a schematic section of a master cylinder assembly including a solenoid control valve;

Figure 1:
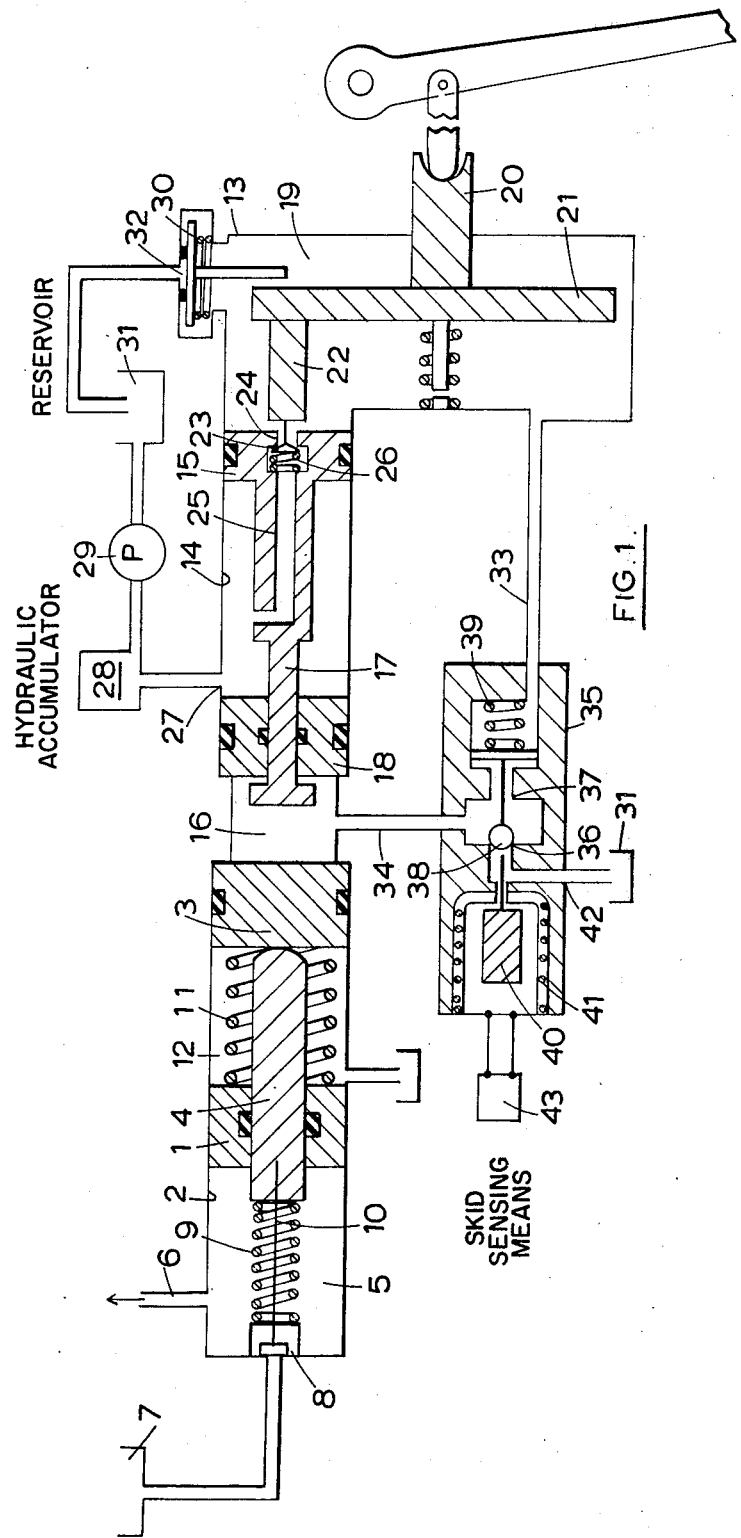

In the power or booster operated master cylinder assembly illustrated schematically in FIG. 1 of the accompanying drawings 1 is a housing provided with a longitudinally extending bore 2 in which works a modulator piston 3 acting on a main piston 4 for pressurising fluid in a pressure space 5 in the bore 2 in the front of the piston 4. The pressure space 5 is adapted to be connected to the brakes of at least one wheel of a vehicle through an outlet port 6 and to a reservoir 7 for fluid through an axial valve 8. Normally the valve 8 is held in an open retracted position by means of return spring 9 which holds the piston 4 in a retracted position and thus the valve 8 through a coupling rod 10. A return spring 11 for piston 3 is located in a chamber 12 connected to reservoir.

A separate housing part 13, is provided with a longitudinally extending bore 14 in which works a piston 15.

The bore 14 is aligned with the bore 2 and communicates therewith through a chamber 16 of reduced diameter. The piston 15 is provided with an axial extension 17 which works through an opening in the closure 18 defining one wall of the chamber 16 and at its outer end projects into the chamber 16.

At its rear end the bore 14 leads into an annular chamber 19 of substantial diameter of which the axis is displaced radially from that of the bores 2 and 14. An axially movable push-rod 20 working through a central opening in the rear wall of the housing part 13 is adapted to be advanced by operation of a foot-pedal. The inner end of the push-rod 20 carries a circular plate 21 provided with an axially extending radially arranged projection 22 defining, at its free end, a valve head 23 for engagement with a complementary seating 24 in the piston 15 at the rear end of a passage 25 providing communication between the bore 14 and the chamber 19. Normally the valve head 23 is urged against the seating 24 by means of a return spring 26 acting on the valve head 23 so that communication between an inlet port 27, for connection to a hydraulic accumulator 28 supplied by a high pressure pump 29, and the chamber 19 is cut-off. In this position the rear face of the plate 21 engages with the stem of a spring-loaded tilting valve member 30 to hold that member in an open position so that the chamber 19 communicates with a reservoir 31 for supplying fluid to the pump 29 through an outlet port 32.

The chamber 19 communicates with the chamber 16 through passages 33 and 34 between which is interposed pressure relief means comprising a solenoid-operated valve assembly 35. The solenoid-operated valve assembly 35 incorporates first and second axially spaced seatings 36 and 37 and a valve member in the form of a ball 38 for engagement, alternately with the seatings 36 and 37. Normally the ball 38 is urged into engagement with the seating 36 by means of a spring 39 so that the passages 33 and 34, and as a consequence, the chambers 19 and 16 are in communication.

The housing of the valve assembly embodies an armature 40 which acts, when the solenoid 41 is energised, to urge the ball 38 out of engagement with the seating 36 and into engagement with the seating 37. In this position communication between the chambers 19 and 16 is cut-off, and the chamber 16 is placed in communication with reservoir 31, through an outlet port 42 communicating at its inner end with seating 36.

In operation, actuating the pedal advances the plate 21 initially to move it out of engagement with the stem of the valve member 30 which then closes under the influence of the spring-loading. Further movement of the plate 21 in the same direction urges the head 23 away from the seating 24 so that high pressure fluid is admitted to the chamber 19. This is then transmitted to the chamber 16 to act on the piston 3 and advance it and piston 4. Initial movement of the piston 4 closes the valve 8. Thereafter, further movement of the piston 4 pressurises the fluid in the pressure space 5 which is supplied through the outlet port 6 to hydraulic actuators to operate the wheel brakes of the vehicle.

When the braked wheel approaches an incipient wheel slide condition a signal from skid sensing means 43 energises the solenoid 41 which advances the armature 40 as described above to urge the ball 38 into engagement with the seating 38 to cut-off the supply of fluid to the chamber 16 and, at the same time, place the chamber 16 in communication with the reservoir to relieve the pressure in the chamber 16. The pressure in the space 5 is then operative to return the piston 4 into a retracted position, thus reducing the pressure in the pressure space 5 and relieving the pressure applied to the hydraulic actuators.

When the solenoid becomes de-energised, the pressure of the fluid in the passage 33 and the force of the spring 39 are operative to urge the ball 38 away from the seating 37 and into engagement with the seating 36. Thus, the brakes are re-applied automatically as described above.

In the event of failure of the high pressure source, the brakes can still be applied by direct engagement of the free end of the extension 7 with the piston 3.

Our invention has the advantage that all components of the assembly are moved continually and thus, there is no danger of any component failing to operate when it is required to move. For example, the piston 15 moves in the bore 14 when subjected to equal pressures on opposite sides since the effective area of the piston 15 adjacent to the chamber 19 is greater than the effective area of the opposite side comprising, as it does, the total are of the piston 15 minus the area of the extension 17.

Also, power assistance becomes operative only after a relatively small pedal-travel which has to be increased only very slightly upon failure of the high pressure supply.

The rate at which the braking pressure can be relieved is relatively fast since all the pressure in the chamber 13 can be relieved to the reservoir.

Figure 2:
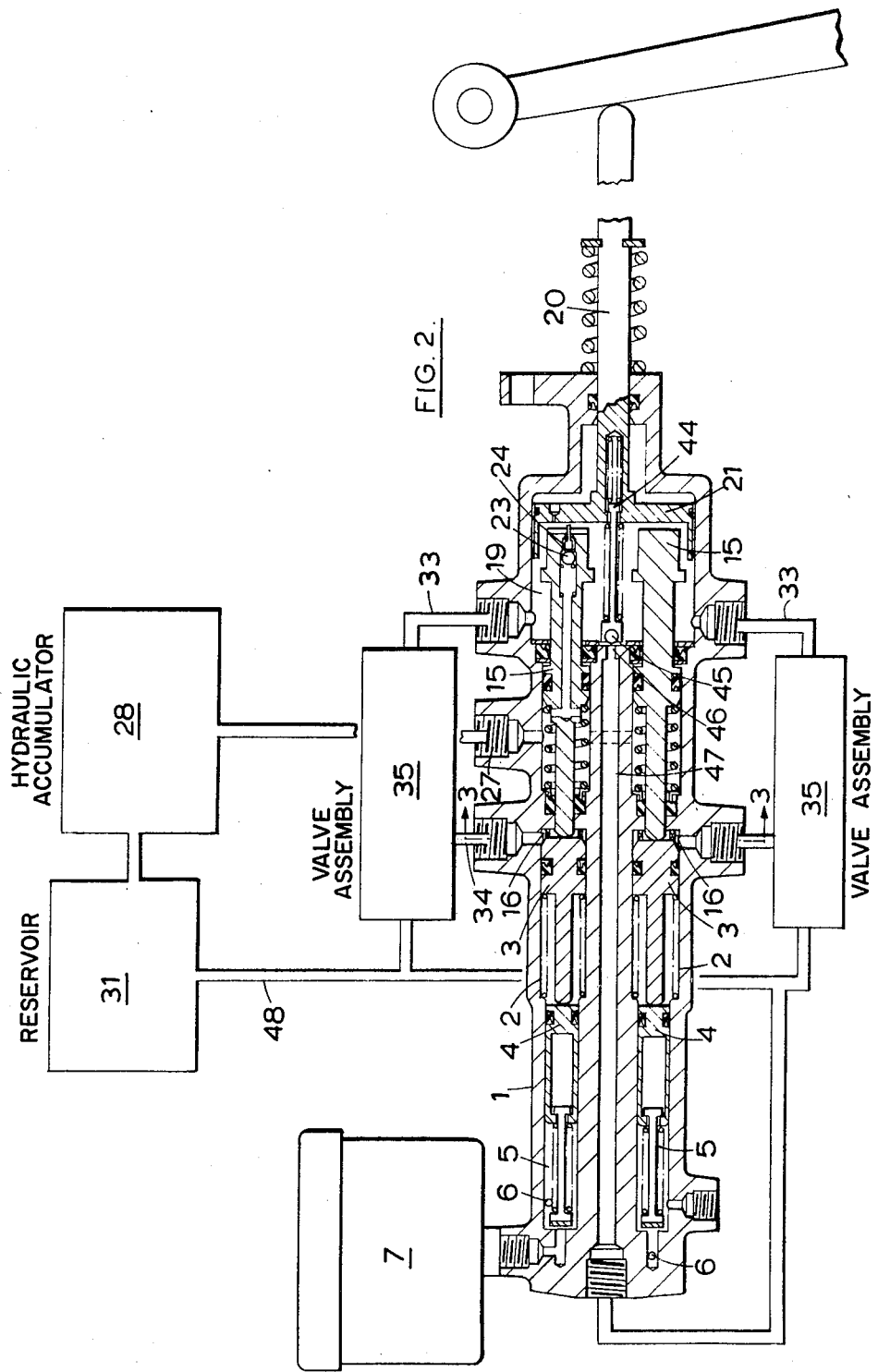
FIG. 2 is a section on the line 2—2 of FIG. 3 of a modified assembly.
Figure 3:
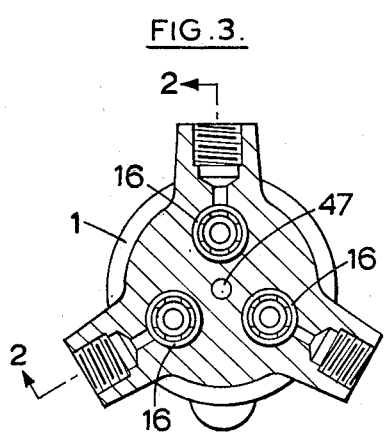
FIG. 3 is a section on line 3—3 of FIG. 2.
Figure 4:
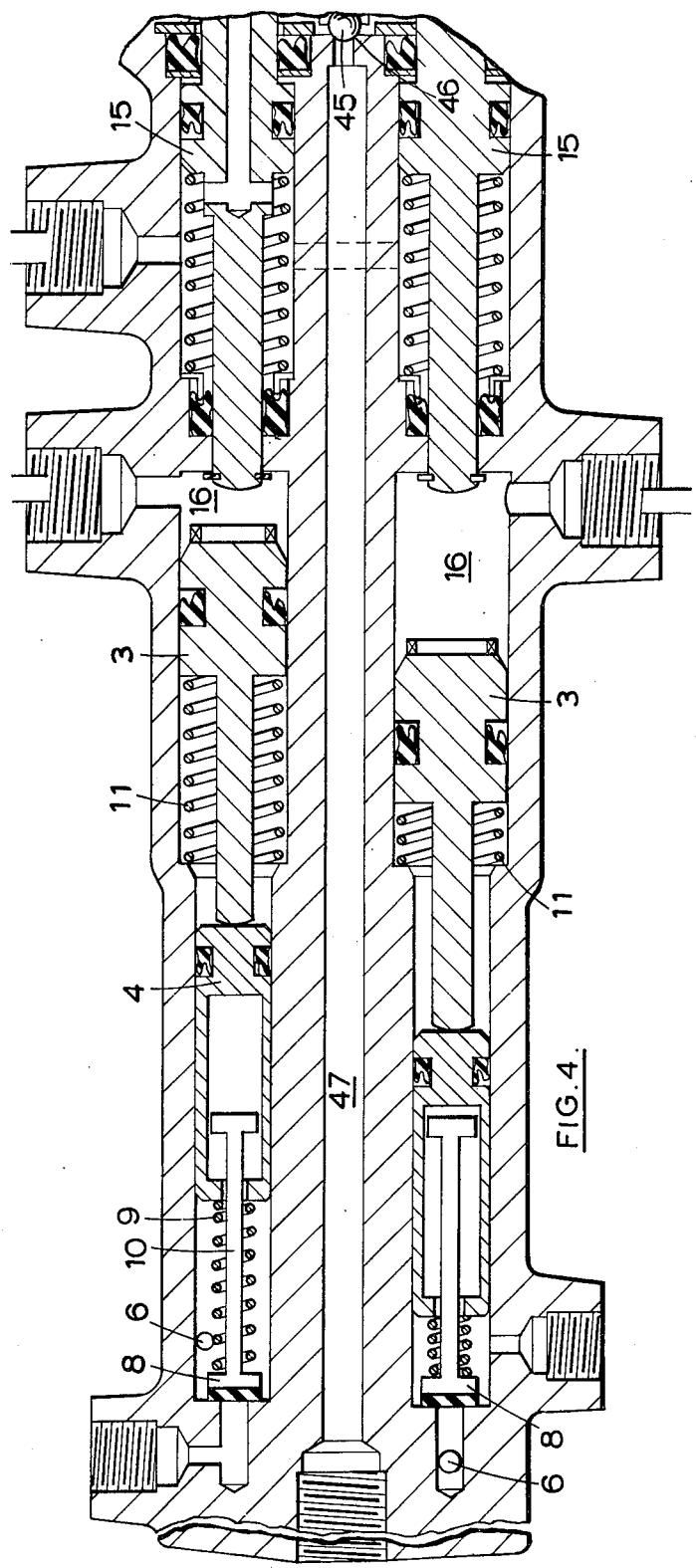
FIG. 4 is a section similar to a part of FIG. 2 with the assembly partly actuated.

In the modified master cylinder assembly illustrated in FIGS. 2 to 4, the tilting valve member 30 is omitted and the circular plate 21 is coupled to an axially displaceable stem 44 carrying, at its free end, a valve head 45 for engagement with a seating 46 at the inner end of a central longitudinally extending bore 47 in the housing 1 of which the outer end is connected to the reservoir 31 through an external connection 48. Normally the valve head is spaced from the seating 46 so that the chamber 19 is in communication with the reservoir 31.

When the master cylinder is operated, the head 45 engages with the seating 46 to cut-off communication between the reservoir and the chamber 19. Thereafter, further movement of the circular plate 21 in the same direction urges the valve member 23 away from the seating 24 to admit fluid under pressure from the high pressure source 28 into the chamber 19.

The fluid under pressure in the chamber 19 is adapted to be admitted through each of three solenoid-operated valve assemblies 35 to a separate chamber 16 behind each of three modulator pistons 3 working, respectively, in each of three angularly spaced bores 2 in the housing which are arranged on a pitch circle of constant diameter of which the bore 47 comprises the centre. The outlet port 6 from each pressure space 5 is connected to a different wheel brake. Preferably, two of the outlet ports are connected to brakes on different front wheels of a vehicle, and the remaining outlet port 6 is connected to both the rear wheel brakes.

When the master cylinder assembly is operated, brakes actuated from the three pressure spaces are applied simultaneously and the braking sequence of each brake is modulated or controlled by the solenoid-operated valve assembly 35 for that brake through which high pressure fluid is supplied to the chamber 16. For example, as illustrated in FIG. 4, the brake actuated by the lowermost outlet port 6 is applied, but the pressure normally applied from the uppermost outlet brake 6 has been reduced in response to actuation of the solenoid-operated valve assembly 35 which, in turn, is responsive to the deceleration of that wheel.

The construction and operation of the embodiment of FIGS. 2 to 4 is otherwise the same as that of FIG. 1 and corresponding reference numerals have been applied to corresponding parts.

The embodiment of FIGS. 2 to 4 has the advantage that several master cylinders, each for operating a different wheel brake, can be combined into a single assembly with pressure control means for controlling automatically and independently of pedal-operation, operation of each brake in accordance with the deceleration of the wheel being braked by that brake.

Figure 6:
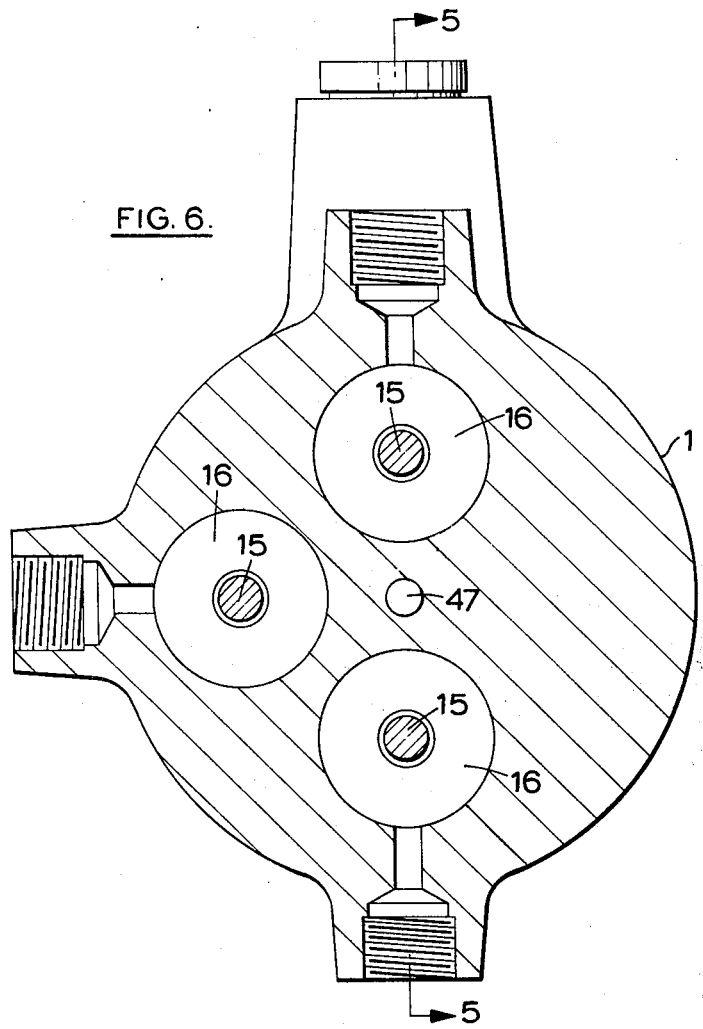
FIG. 6 is a section on the line 6—6 of FIG. 5.
Figure 5:
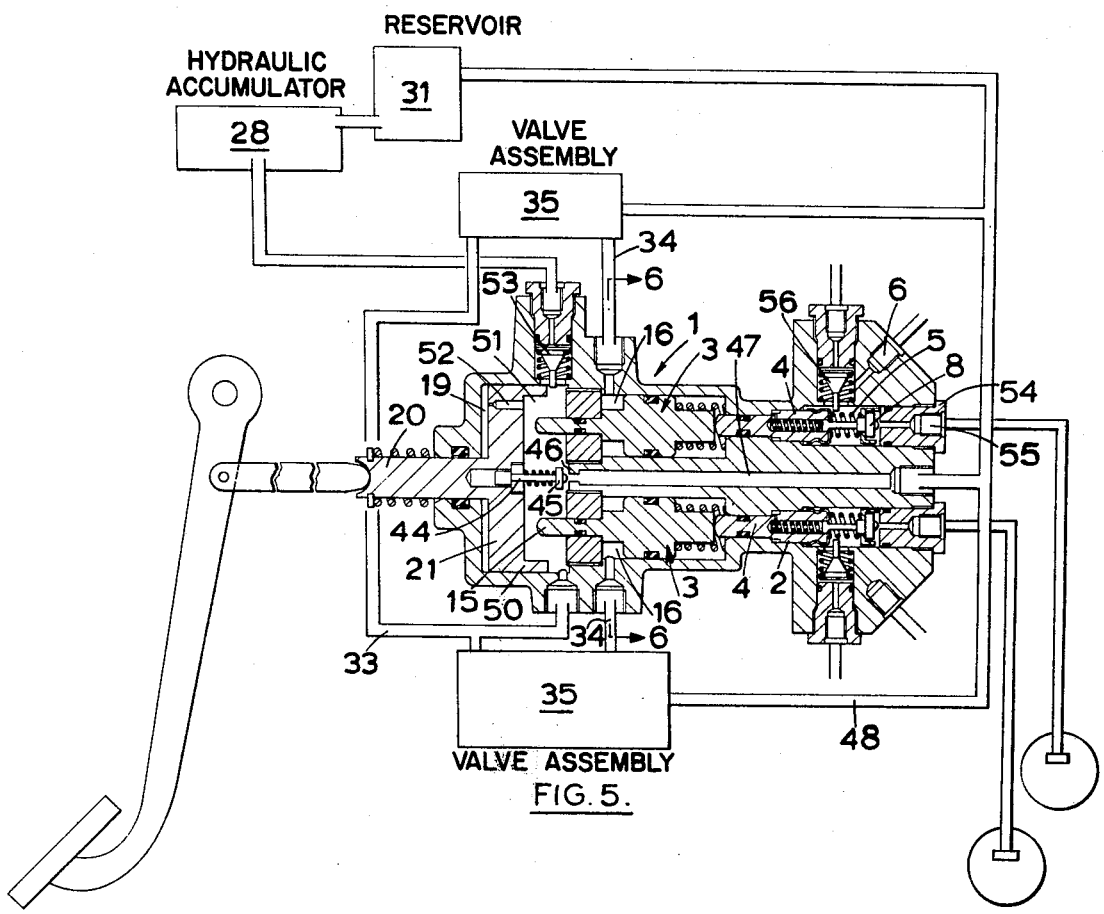
FIG. 5 is a section of a third embodiment on the line 5—5 of FIG. 6.
Figure 7:
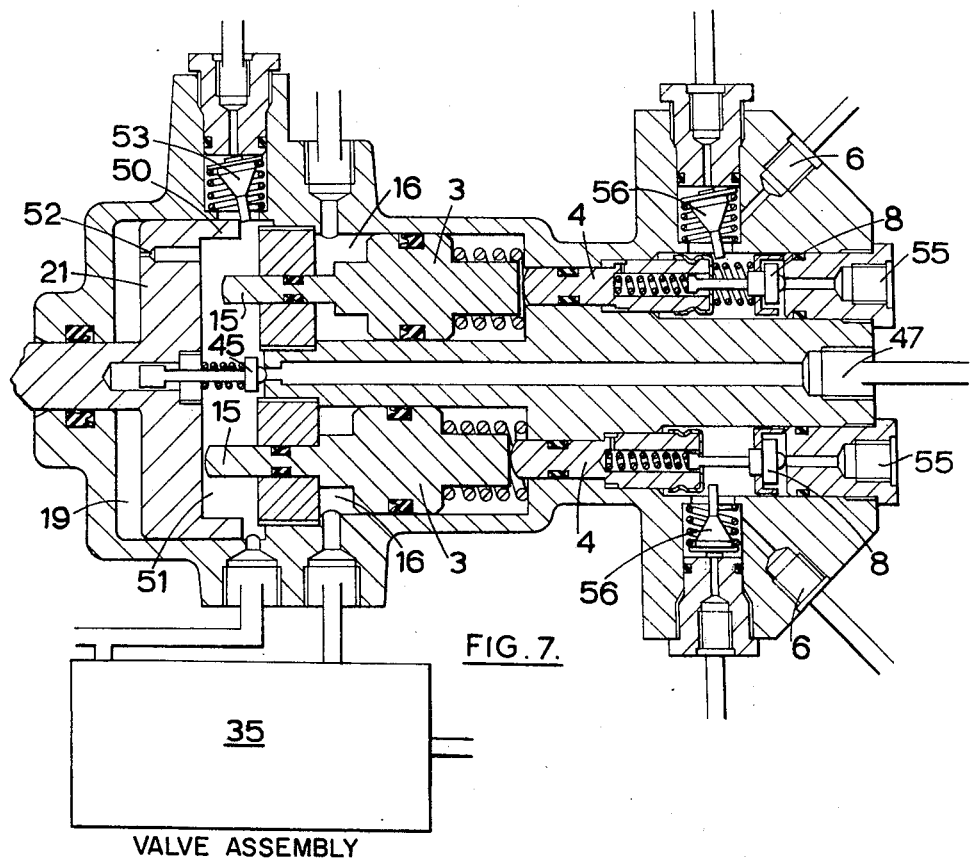
FIG. 7 is a section similar to FIG. 5 with the assembly partly actuated.

In the modified master cylinder assembly illustrated in FIGS. 5–7 corresponding reference numerals have been applied to corresponding parts. The circular plate 21 comprises a piston working in a bore in the housing 1 and incorporating an axially extending peripheral skirt 50. The chamber 19 communicates with a chamber 51 through an orifice 52 in the piston 21.

Communication between the chamber 51 and the source 28 of hydraulic fluid under pressure is controlled by a normally closed tilting valve assembly 53. In the normal inoperative position illustrated in FIG. 5 the skirt 50 is spaced from the stem of the tilting valve assembly so that it is closed and the chamber 51 is in communication with the reservoir 31 for fluid through the central longitudinally extending bore 47 in the housing 1 since, the valve head 45 carried by the axially displaceable stem 44 is spaced from the seating 46.

Each of the main pistons 4 is of differential outline and the portion of the longitudinally extending bore 2 in which it works is of complementary stepped outline. The modulator pistons 3 act on the ends of the pistons 4 which are of smaller area. The pistons 15 have been incorporated in the pistons 3 which are also stepped.

The pressure space 5 is defined in the bore 2 between the outer end of piston 4 and a plug 54 closing the end of the bore. Each pressure space 5 is normally connected to a second reservoir for fluid through an axial passage 55 in the plug 54. Communication between a second high pressure source and the pressure spaces is controlled by individual tilting valve assemblies 56. In a normal inoperative retracted position illustrated in FIG. 1 the tilting valve assemblies 56 are closed. In this position the pressure spaces 5 are in communication with the second reservoir and the axially movable valve assembly 8 coupled to each piston 4 is held in an open position.

When the master cylinder assembly is operated by the pedal, the head 45 engages with the seating 46 to cut-off communication between the reservoir and the chamber 51. Thereafter, further movement of the piston 21 in the same direction opens the tilting valve assembly 53 so that fluid under pressure from the high pressure source 28 is admitted to the chamber 51.

The fluid under pressure in the chamber 51 is adapted to flow through each of the three solenoid-operated valve assemblies 35 into the separate chambers 16 behind each of the three pistons 3 which work respectively, in each of the three bores in the housing 1 which are angularly spaced around bore 47.

For example, as illustrated in FIG. 7, the brake actuated by the uppermost outlet port 6 is applied, but the pressure normally applied from the lowermost outlet port 6 has been reduced in response to actuation of the solenoid-operated valve assembly 35 which, in turn, is responsive to the incipient slide condition of that wheel. The construction and operation of the embodiment of FIGS. 5 to 7 is otherwise the same as that of FIGS. 2 to 4.

We claim:

1. In an anti-skid braking system for a vehicle comprising brakes on wheels of the vehicle, a source of booster fluid under pressure, a first reservoir for fluid for said source, a master cylinder assembly responsive to said source of booster fluid to apply said brakes, and skid sensing means for providing a signal when at least one of said wheels skids during application of said brake on that wheel, said master cylinder assembly comprising a housing, a booster valve assembly for controlling flow of fluid from said source to a booster chamber in said housing, at least two master cylinder pistons working in separate first bores in said housing to generate hydraulic fluid pressure in pressure spaces for connection to said wheel brakes and defined in said bores ahead of said pistons, normally open valves controlling communication between said pressure spaces and at least one second reservoir, said valves being closed when said master cylinder pistons are advanced in said bores, modulator pistons corresponding in number to said master cylinder pistons working in separate second bores in said housing, means for applying from each modulator piston an operating force to the one master cylinder piston with which it corresponds to advance the said one master cylinder piston in said first bore, valve housings corresponding in number to said master cylinder pistons and each having ports connected respectively to said booster chamber, said modulator piston and the reservoir for said source of fluid pressure, a solenoid operated valve in each of said housings normally occupying a first position connecting the booster chamber port and modulator port while disconnecting the latter and said reservoir port but being movable to a second position disconnecting said booster chamber port and said modulator port while connecting the latter and said reservoir port, and means for actuating said solenoid operated valve to move it from its first normal position to its second position to reduce the force on said modulating piston by relieving the pressure fluid acting thereon to the reservoir for said source of fluid pressure in response to a signal from said skid sensing means when a wheel on which the brake is being applied through said modulator piston skids.

2. In the anti-skid system of claim 1 wherein said booster valve assembly includes a pedal-operated valve actuating member, and means carried by said actuating member operatively engageable with said master cylinder to apply the same mechanically in the event of failure in the supply of booster fluid pressure.

* * * * *